Patented July 8, 1941

2,248,494

UNITED STATES PATENT OFFICE 2,248,494

NONFLAMMABLE HEAT TRANSFER AGENT

Robert R. Dreisbach and Ray H. Boundy, Midland, Mich., assignors to The Dow Chemical Company, Midland, Mich., a corporation of Michigan No Drawing. Application April 29, 1939,
Serial No. 270,902

4 Claims. (Cl. 252—78)

This invention concerns certain new non-flammable liquid heat transfer agents which comprise as an essential ingredient a mixture of isomeric ethyl dibromobenzenes having the general formula

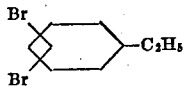

The ethyl dibromobenzene isomeric mixture is prepared by the nuclear bromination of ethylbenzene. Its composition, i. e. the proportions of various isomers present, may be varied somewhat by changes in the conditions under which the bromination is carried out or by fractionating the liquid mixture. However, all such isomeric mixtures prepared as just described are suitable for use in the invention.

We have found that the ethyl dibromobenzene isomeric mixture possesses an unusual combination of properties which render it especially useful as the essential ingredient in a series of new liquid heat transfer compositions which are suitable for use over a wide range of temperatures. It is non-flammable, regardless of the temperature of testing, and is substantially non-corrosive toward the usual structural metals, such as iron, steel, aluminum, etc. It possesses a low freezing point, a high boiling temperature, and a viscosity sufficiently low to permit ready flow with excellent heat transfer under the usual working conditions. Its physical properties are as follows: boiling point at 760 millimeters, approximately 258° C.; freezing point, −70° C.; viscosity at 0° F., 116.7 millipoises; viscosity at 100° F., 24 millipoises; viscosity at 235° F., 8.9 millipoises.

It will be noted from the properties just given that the ethyl dibromobenzene isomeric mixture is adapted to use at atmospheric pressure as a heat transfer agent at temperatures considerably below the freezing point and above the boiling point of water. Accordingly, it may be used as a refrigerant at temperatures far below 0° C., or as a heat transfer agent, e. g. a radiator fluid for internal combustion engines, at temperatures as high as 258° C. Its non-flammability, non-corrosiveness toward metals, and its combination of physical properties render it ideally suited to these and a variety of other heat transfer purposes. By employing it in a closed system at super-atmospheric pressure, it may, of course, be used for heat transfer purposes at temperatures considerably above its normal boiling point, e. g. at temperatures between 350° and 400° C. In all such heat transfer operations, as is well known, the liquid heat transfer agent is contacted simultaneously or alternately with a relatively hot surface, e. g. the cylinder block of an internal combustion engine. and a relatively cool surface, e. g. the metal surfaces of a radiator, whereby heat is caused to flow from the relatively hot surface to the liquid heat transfer agent and from the latter to the relatively cool surface.

Although the ethyl dibromobenzene isomeric mixture is well suited to use without dilution as a heat transfer agent, it usually is employed in admixture with other halogenated aromatic hydrocarbons, such as dichlorobenzene, trichlorobenzene, tetrachlorobenzene, bromo - dichlorobenzene, dibromobenzene, dibromotoluene, fluoro - dichlorobenzene, fluorochloro - bromobenzene, etc., which are either non-flammable or difficultly flammable but which, because of their relatively high freezing temperatures or other objectionable properties, are not as well suited to be used alone for such purposes. By diluting the ethyl dibromobenzene with such other halogenated aromatic hydrocarbons, the cost of the final products may be reduced and the properties desired in the heat transfer agents, e. g. low freezing point or low viscosity, etc., may often be improved. Such heat transfer agents comprising the ethyl dibromobenzene isomers along with other halogenated aromatic hydrocarbons are compounded so as to remain liquid at temperatures below −20° C., and preferably below −30° C. They usually contain at least 20 per cent by weight, and preferably more than 50 per cent by weight, of the ethyl dibromobenzene isomers.

The following examples describe a number of heat transfer compositions which have been prepared in accordance with the invention, but they are not to be construed as limiting the invention.

Example 1

Trichlorobenzene and a mixture of isomeric ethyl dibromobenzenes, prepared by brominating ethyl benzene, were admixed in the proportions of 27.5 per cent by weight of trichlorobenzene and 72.5 per cent of ethyl dibromobenzene. The resultant composition boiled at atmospheric pressure over the temperature range 217.5°–258° C. It had the specific gravity 1.649 at 25°/25° C., freezing point −40° C., and a viscosity of 95.5 millipoises at 0° F., or 9.86 millipoises at 235° F. It was non-flammable and could be used as a liquid heat transfer agent at temperatures varying between —40° C. and 217° C. without application of pressure, or at even higher temperatures, e. g. 350° C., by applying pressure on the system in which it is used.

Example 2

To 9 parts by weight of the heat transfer agent consisting of ethyl dibromobenzene and trichlorobenzene, which was described in Example 1, there was added 1 part of an isomeric mixture of fluoro-dichlorobenzenes (which isomeric mixture was prepared by the nuclear chlorination of the fluorobenzene). The resultant composition remained liquid, although it became cloudy at temperatures as low as —70° C. It had a viscosity of 75 millipoises at 0° F., or 9.8 millipoises at 235° F. It boiled at temperatures above 172° C. and was non-flammable.

Example 3

To 9 parts by weight of the heat transfer agent described in Example 1, there was added 1 part of an isomeric mixture of fluoro-chloro-bromobenzenes, which isomeric mixture was prepared by the successive chlorination and bromination of fluorobenzene. The resultant mixture remained liquid but became cloudy at —70° C. and boiled at temperatures above 180° C. Its viscosity was 92 millipoises at 0° F., or 9.45 millipoises at 235° F. It was non-flammable and substantially non-corrosive toward metals.

Example 4

Approximately 9 parts by weight of the ethyl dibromobenzene isomeric mixture was treated with 1 part of the fluoro-dichlorobenzene isomeric mixture mentioned in Example 2. The resultant composition was a clear liquid at temperatures as low as —75° C. and boiled at temperatures above 172° C. Its viscosity was 91 millipoises at 0° F., or 9.43 millipoises at 235° F. It was non-flammable and non-corrosive toward metals.

Example 5

A mixture of 78 per cent by weight of the isomeric fluoro-dichlorobenzenes and 22 per cent of the isomeric ethyl-dibromobenzenes had a freezing point of —55° C., and a viscosity of 37.5 millipoises at 0° F., or 8.29 millipoises at 235° F. It boiled at temperatures above 172° C. and was non-flammable.

Example 6

A weighed sample of aluminum foil was immersed in the isomeric mixture of ethyl dibromobenzenes and the mixture was heated in contact with the foil at a temperature of 110° C. for 6 hours. No corrosion of the aluminum foil was observed.

Other modes of applying the principle of the invention may be employed instead of those explained, change being made as regards the compositions herein disclosed, provided the ingredient or ingredients stated by any of the following claims or the equivalent of such stated ingredient or ingredients be employed.

We therefore particularly point out and distinctly claim as our invention:

1. A non-flammable liquid heat transfer agent freezing at a temperature below —20° C. and boiling at a temperature above 150° C., which agent comprises a mixture of isomeric ethyl dibromobenzenes and isomeric dichloro-fluorobenzenes, and contains at least 20 per cent of the ethyl dibromobenzene isomers.

2. A non-flammable liquid heat transfer agent freezing at a temperature below —20° C. and boiling at a temperature above 150° C., which agent comprises trichlorobenzene and a mixture of ethyl dibromobenzene isomers and contains at least 20 per cent of the ethyl dibromobenzenes.

3. A non-flammable liquid heat transfer agent freezing at a temperature below —20° C. and boiling at a temperature above 150° C., which agent comprises a mixture of isomeric ethyl dibromobenzenes and a different nuclear halogenated aromatic hydrocarbon and contains at least 20 per cent by weight of the ethyl dibromobenzene isomers.

4. The method of transferring heat which comprises contacting a non-flammable liquid heat transfer agent containing at least 20 per cent by weight of a mixture of isomeric ethyl dibromobenzenes and a different nuclear halogenated aromatic hydrocarbon with a relatively hot surface and with a relatively cool surface, whereby heat flows from the relatively hot surface to the heat transfer agent and from the latter to the cooler surface, the agent employed being one having a freezing point below —20° C. and a boiling point above 150° C.

ROBERT R. DREISBACH.
RAY H. BOUNDY.